United States Patent
Scharber (10) Patent No.: US 6,542,964 B1
(45) Date of Patent: Apr. 1, 2003

(54) COST-BASED OPTIMIZATION FOR CONTENT DISTRIBUTION USING DYNAMIC PROTOCOL SELECTION AND QUERY RESOLUTION FOR CACHE SERVER

(75) Inventor: John M. Scharber, Livermore, CA (US)

(73) Assignee: Blue Coat Systems, Sunnyvale, CA (US)

( * ) Notice: Subject to any disclaimer, the term of this patent is extended or adjusted under 35 U.S.C. 154(b) by 0 days.

(21) Appl. No.: 09/324,360

(22) Filed: Jun. 2, 1999

(51) Int. Cl.[7] ............................................. G06F 12/00
(52) U.S. Cl. ...................... 711/122; 711/124; 710/11; 709/228; 709/230; 709/105
(58) Field of Search .................................. 711/119, 122, 711/124, 128, 141, 118, 144, 145, 108, 110; 710/11; 709/228, 230, 105

(56) References Cited

U.S. PATENT DOCUMENTS

| | | | | |
|---|---|---|---|---|
| 5,787,470 A | * | 7/1998 | DeSimone et al. | 711/124 |
| 6,052,718 A | * | 4/2000 | Gifford | 709/219 |
| 6,101,545 A | * | 8/2000 | Balcerowski et al. | 370/464 |
| 6,112,279 A | * | 8/2000 | Wang | 711/119 |
| 6,205,148 B1 | * | 3/2001 | Takahashi et al. | 370/395.54 |
| 6,317,808 B1 | * | 11/2001 | Berenshteyn | 710/39 |
| 6,324,582 B1 | * | 11/2001 | Sridhar et al. | 709/228 |
| 6,449,647 B1 | * | 9/2002 | Colby et al. | 709/226 |

FOREIGN PATENT DOCUMENTS

WO  WO 99/03047  1/1999

OTHER PUBLICATIONS

Microsoft (1997). Cache Array Routing Protocol and MS Proxy Server version 2.0. Microsoft TechNet. Retrieved Aug. 31, 2000 from Microsoft TechNet on the World Wide Web: http://www.microsoft.co.*
Oguchi, M. Et Al., "A Proposal for a world–wide web caching proxy mechanism", NI Amsterdam, IOS, Oct. 1, 1996, pp. 531–540, XP000754599.
Grimm, C, Et Al., "Load and traffic balancing in large scale cache meshes", Computer Networks and ISDN systems, NL, North Holland Publishing, Amsterdam, vol. 30, No. 16–18, Sep. 30, 1998, pp. 1687–1695, XP004138701.
PCT—Search Report PCT/US 00/11077, Oct. 11, 2000.

* cited by examiner

Primary Examiner—Matthew Kim
Assistant Examiner—Matthew D. Anderson
(74) Attorney, Agent, or Firm—Blakely Sokoloff Taylor & Zafman LLP (57) ABSTRACT

Storing content of a particular type at one or more cache servers may be accomplished according to a cache protocol selected according to the type of the content, a site (e.g., an origin server) associated with the content and/or a class of service requirement. In this scheme, the cache protocol may be selected and/or varied according to load balancing requirements and/or traffic conditions within a network. For example, the cache protocol may migrate from a first protocol (e.g., CARP) that allows only one copy of the content to be stored to a second protocol (e.g., HTCP or ICP) that allows more than one copy of the content to be stored. Further, the depth to which a request query is to be searched within a cache hierarchy may be determined according to the site, the content type and/or the class of service. Where necessary, a path for retrieving the content may be determined, at least in part, according to the content type.

43 Claims, 4 Drawing Sheets

COST-BASED OPTIMIZATION FOR CONTENT DISTRIBUTION USING DYNAMIC PROTOCOL SELECTION AND QUERY RESOLUTION FOR CACHE SERVER

FIELD OF THE INVENTION

The present invention relates to schemes for caching content, and in particular, Internet content, at one or more locations.

BACKGROUND

Internet content, in its broadest sense, can be thought of as data, objects or information available via the Internet (perhaps through the World-Wide-Web (WWW) graphical user interface) using the hypertext transfer protocol (HTTP), the file transfer protocol (FTP) or other protocols such as the real-time streaming protocol (RTSP). A cache is a way to replicate requested Internet content on a system closer (either physically or logically) to the requesting site than to the source. The cache can then be used as a means to reduce the time needed to access the content, improve network reliability and reduce upstream bandwidth consumption.

Figure 1:
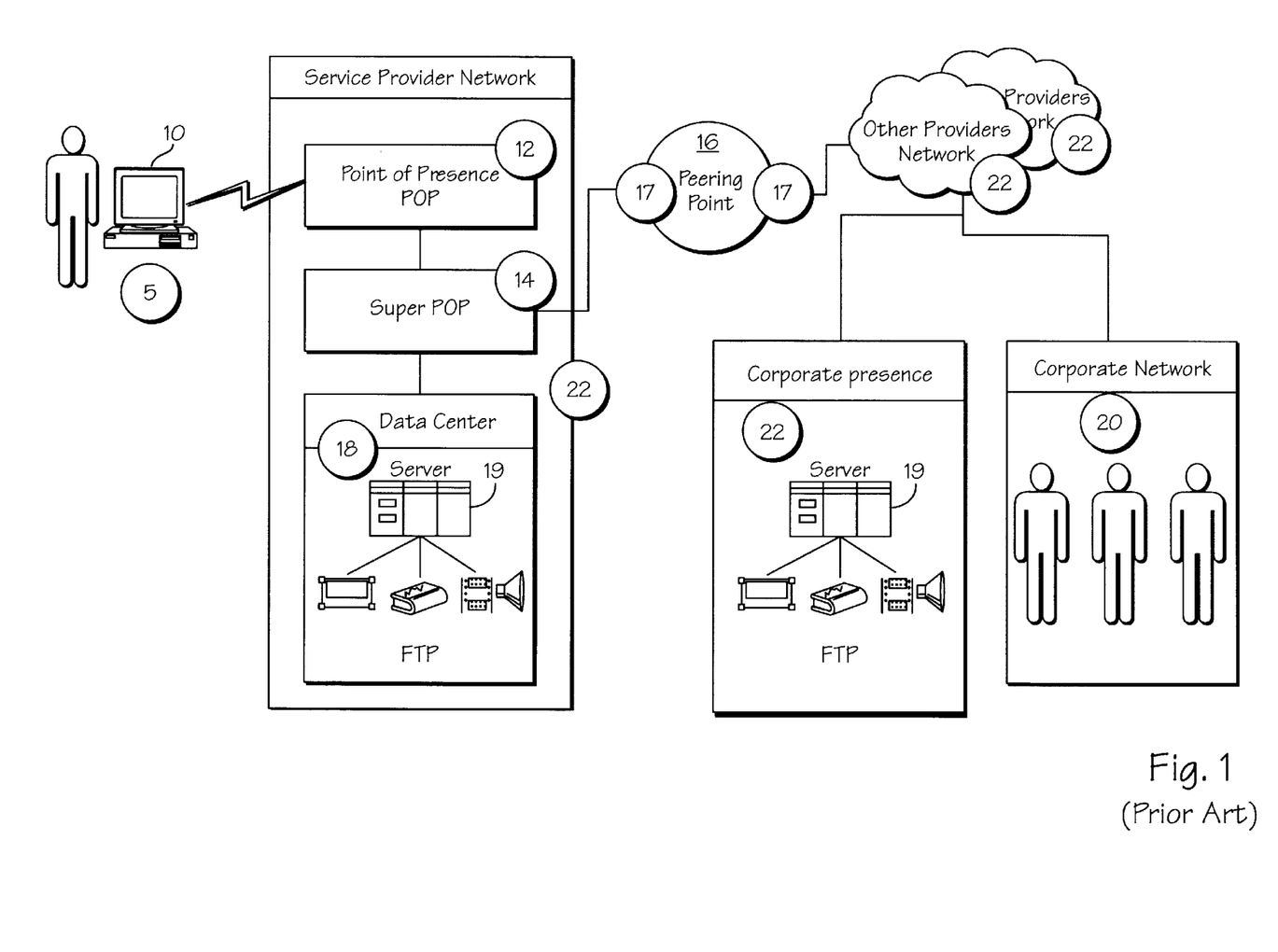
FIG. 1 illustrates various locations at which cache servers are commonly deployed in a network.

Caching can be performed at any point along a delivery path between the client that requests the information and the server (or other source) that provides it. Different terms are used to refer to the cache, depending on where it is deployed in the delivery path. FIG. 1 shows some of the common locations in which caches (sometimes referred to as cache servers) can be deployed:

A personal cache server or personal proxy server 5 may be associated with an individual user's personal computer 10. The function of a personal cache server 5 is to improve user performance by keeping local copies of frequently request content on the user's personal computer 10. Most commercial web browsers available today include some caching capability but this functionality is generally limited in terms of features and storage capacity. Some personal cache servers may be configured so as to attempt to anticipate what the user's future content requests might be. Then, these anticipated requests can be pre-fetched before they are actually requested by the user or a user application. By avoiding long delays before requested content is returned, the user's experience is enhanced.

A personal proxy server extends the concept of a personal cache server by servicing more than one client. In most cases, personal proxy servers are used to connect two or more computers/devices to a network (e.g., the Internet) over a single connection. The proxy server hides the fact that there is more than one computer by using either a network address translation (NAT) scheme or local address translation (LAT) scheme to assign fictitious addresses to the computers connecting to the personal proxy server. When the proxy server receives a request, it translates the fictitious address into a real Internet Protocol (IP) address and forwards the request using the real IP address. When a response is received, the proxy server translates the address back to the original fictitious address and returns the reply to the client that initiated the request.

Another common cache sever is the Point Of Presence (POP) cache server 12. POP cache servers 12 may be deployed by Internet Service Providers (ISPs) and are used both to improve user performance and to manage bandwidth costs. POP cache servers are typically configured in one of two ways; either as a proxy, where each user specifically requests use of the cache, or as a transparent cache, to which all requests are redirected.

Edge cache servers 14 are also common features in ISPs' networks. The primary roll of an edge cache server is to minimize traffic across a service provider's backbone. As most service providers lease their backbone network circuits from other carriers, the use of a cache at this level can lead to significant cost savings. For example, a service provider may install an edge cache device in each of the provider's major regional network centers (often referred to as super POPs) so that data is only transmitted across the (leased) backbone a minimum number of times.

Cache servers 17 may also be installed at peering points 16. To understand why cache servers are used at this level, consider that the Internet is made up of thousands of separate networks. In order for these networks to exchange information efficiently, peering points 16 were created so that service providers could interconnect their respective networks. Unfortunately, peering points have become saturated, at least in part because the same piece of information is often moved across the peering point thousands of times. By placing cache servers 17 at the peering points (to establish what has become known as content peering), service providers are able to transfer particular content across the peering point only once and then serve all subsequent requests for that content from the cache 17. This helps to reduce the amount of traffic being transferred across the peering point 16, thus improving response time.

Cache servers may also be deployed to act as so-called HTTP accelerators 18 at various locations. Because cache servers are often much more lightweight and efficient than a full featured server they are often used to front-end the actual servers 19. This is most often done with web servers and the resulting entity is referred to as an HTTP accelerator. When a user request is received, it is directed to one of the available accelerators, which because it already has the information is able to respond to the request without the need to communicate back the origin server 19. This significantly reduces the workload on the origin server, which in turn improves user response time. Caches are also used in connection with firewall proxy servers 20. A firewall proxy server is often found at a company's connection to the Internet and performs many different functions. For example, the firewall proxy server 20 may block outside requests to access the company's internal network. The firewall proxy server 20 also gives the company the ability to control employee access to the Internet. If so equipped, the firewall proxy server 20 can store frequently requested information in a cache to improve user response time and reduce networks costs. In addition, it can be integrated with universal resource locator (URL) databases that restrict access to sites that may contain material that is not consistent with company policies. Until recently, the primary focus of these devices has been on access control and security and as such have had limited caching capability.

Finally, cache servers may be associated with distributed content caching (DCC)/reverse proxy operations. One significant requirement for any enterprise doing business on the Internet is to be able to scale their service and manage user response time. Distributed content caching does just that. In this configuration, cache servers 22 may be deployed at major traffic sites for a provider's content. In this case, a provider may be an Internet service provider, a content provider or even a country provider (e.g., where a particular provider deploys access systems that allow users in overseas countries to access Web sites in the United States).

Unlike database replication, where data is duplicated based on content being created, updated, or deleted, cache replication is dynamic, which simply means it is based on a client request. The advantage of dynamic replication is that only the content that is requested gets replicated. The disadvantage is that changes to the original content are not automatically applied to the replicated content. To overcome this disadvantage, a cache needs to be able to check for possible discrepancies between its copy of the content and the original. There are many different methods for validating cache content coherency—what type of content is being replicated and other business requirements often dictate the best method for a particular situation. In general though, most cache coherency methods do not require that the original content be checked each time a client requests it. Instead these schemes provide a means for defining how stale (i.e., how old) a cached copy of content must be before it is re-checked against the original.

Which method of cache coherency is used to validate replicated content depends many factors (including whether a choice of coherency methods is available at all). For information (such as Net News articles) that does not change, there is no need to revalidate as the associated content never changes. For other content types, however, there may be dramatic changes, even over very short time intervals.

The most frequently discussed coherency methodologies deal with HTML content transferred using the HTTP protocol. Such methods are best considered in their historical context. At the outset, consider the situation as it existed before the release of HTTP version 1.1.

Neither the original version of HTTP (HTTP v.0.9) nor its subsequent release (HTTP v.1.0) had direct support for cache servers. This made it very difficult for a cache server to determine if it had a current copy of the replicated content or not. To overcome this problem, two extensions became commonly used by cache servers: "Last-Updated" and "If_Modified_Since".

The initial method for testing the freshness of replicated content relied on Web page authors including a "Last Updated" or "Last Modified" tag in their documents. The cache server could then use this information to determine whether the copy of content it had was still current. As this method became more common, Web servers were updated to automatically include Last-Updated tags in reply headers, based on file modification times. This allowed a cache to retrieve only content summary information regarding the request from the origin server, without transferring the entire document, to determine if its stored copy was current. The problem with this method was that it still required the cache server to connect twice to the origin server if needed to refresh the content.

To solve this problem, a conditional GET operation that included an "If_Modified_Since" variable was developed. When an origin server received a GET request for a document, it would always return the HTTP header information (as before), and if the document had been modified it would also return the updated document without the need for a second request from the cache server.

One feature of the early HTTP versions that was originally intended for clients (e.g., Web browsers) turned out to be useful for cache serves as well. If a document included a "pargma no-cache tag", then the cache server knew to force a revalidation of the replicated content it currently had. Nevertheless, because support for testing content freshness was not part of the original HTTP standards, many cache servers relied only on internal information to determine when content should be refreshed. These methods used associated refresh timers based on content types and were often tunable by the end user.

With the release of HTTP v.1.1 came new support for cache servers. With HTTP v.1.1 both the client and server were able to provide information to a cache server that helped the cache server make decisions about how and when to refresh or expire replicated content. Clients with HTTP v.1.1 are able to now instruct a cache server to never cache a document, refresh if the document is older than a set time period, or refresh if the document will not be stale within a set time period. Servers with HTTP v.1.1 can now instruct a cache server to expire a current copy of a document, not cache a particular response, or only cache a response if it is a private server.

In addition to exploiting this new support for cache servers, others have discovered that there are many situations where arranging cache servers in a hierarchy or a mesh and searching for information amongst caches before directly connecting to an origin server can be beneficial. Such hierarchies may be especially useful where a network is poorly connected such that connecting to the origin server is always slow compared to looking in neighbor caches. Also, situations arise where the desired content is static, allowing a cache server to serve as an economical distribution mechanism. Moreover, cache hierarchies may help reduce redundant traffic across or between networks and, in some cases, may be the only economical method for delivering content.

Currently, the primary method for creating cache hierarchies is through the use of the Internet Cache Protocol (ICP). Using ICP, and referring now to FIG. 2, when a cache 30 receives a request for content from a client 32, the cache 30 first determines whether it has a copy of the requested content. If so, cache 30 responds to the request, otherwise cache 30 determines whether another cache in the hierarchy has a copy of the information that is being requested. In such cases, cache 30 sends a request to its neighbor cache(s) 34 and then, if necessary, to its peer cache 36.

Figure 2:
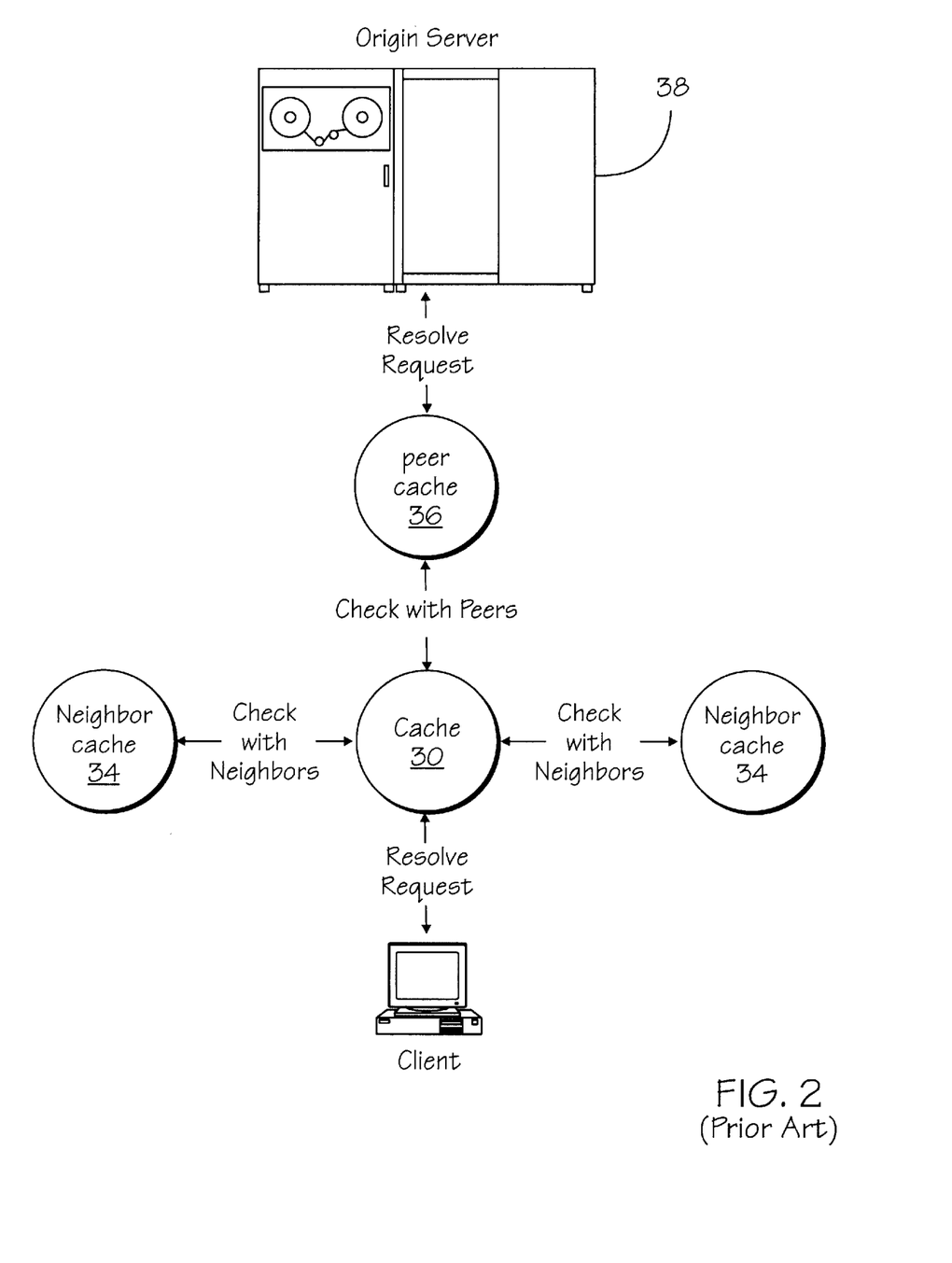
FIG. 2 illustrates an example of a cache hierarchy.

Each neighbor cache 34 (i.e., those at the same level of the hierarchy as cache 30) sends a response indicating whether it has the requested information. That is, the neighbor cache(s) 34 will respond with either a query HIT or a MISS. In the event of a MISS, the neighbors will not attempt to retrieve the requested information on behalf of cache 30. If a neighbor cache 34 does have the requested information (i.e., a cache HIT), it provides that content to cache 30.

If none of the neighbor caches 34 have the requested information; the request is forwarded from cache 30 to the peer cache 36. Peer cache 36 resolves the request (i.e., by retrieving the content from the origin server 38 if it does not have a copy thereof or if that copy; is stale) and returns the requested information to cache 30. In all cases, upon receipt of the requested content, cache 30 stores a local copy and forwards the requested information to the client 32. Of course, in more complex hierarchies it is possible for a peer cache to have neighbors, or for a neighbor cache to be a peer for other caches.

As the above example illustrates, ICP has what is known as a message passing architecture. In order to determine if a given neighbor cache has the requested piece of content, a cache must send the neighbor a message and then wait for a reply. There are drawbacks associated with such a scheme. For example, client response time is increased because the client must wait while messages are exchanged between caches. Further, the message exchange utilizes the very network bandwidth that the cache is trying to save and thus there are limits on the hierarchy size. In addition to these problems, the current ICP implementation suffers from a lack of security, limited payload size and a lack of support for passing so-called "meta" information (e.g., the age of an object).

To address some of these problems, the Cache Array Protocol (CARP) was created. Like ICP, CARP allows a network administrator to define neighbors and peers to create a hierarchy or mesh topology. However, CARP does not rely on message passing to determine which (if any) cache server has the requested content. In CARP, a replicated piece of content is always assigned to the same cache server. Which cache server gets the assignment is determined by computing a unique value (e.g., using a hash function), based on the server and path portions of the URL associated with the requested content. In practice then, every request received by a cache server in the hierarchy can be automatically directed to the cache server that would have the replicated content (if indeed any of the cache servers in the hierarchy do), without having to poll neighbor caches. If the cache server that receives the request does not have a copy, it can go directly to the origin server to retrieve a copy, without the need to transmit any MISS messages. This reduces bandwidth requirements and speeds response time. In addition, CARP also addressed the security and payload size problems inherent in ICP.

While it would seem that CARP would be the ideal cache protocol, in reality it too has drawbacks. For example, CARP is unable to perform load balancing, because requests for a given document or object are always directed to the same server. In other words, there is no ability to distribute frequently requested content among multiple cache servers.

One other approach to solving the problems associated with a message passing architecture is the use of so-called cache digests. In this approach, each neighbor and peer cache broadcasts a list of the content it has to other caches in the hierarchy. This information is used to build a quick look-up table that a cache can use to determine which, if any, cache server has the content being requested. Of course, this approach consumes bandwidth each time the digest is updated.

Thus, it is apparent that each cache protocol has its own associated strengths and weaknesses. Unfortunately, no current caching schemes are available to exploit the benefits of a particular protocol in a dynamic fashion. To complicate matters, other factors that may affect the selection of cache query protocol or other retrieval methods include network latency, network cost (e.g., path cost), network congestion/availability, business rules, quality of service (QoS) parameters, and prior hit and/or useability ratios. What is needed therefor is a scheme that allows for such dynamic protocol selection.

SUMMARY OF THE INVENTION

In one embodiment a scheme that allows for storing content of a particular type at one or more cache servers according to a cache protocol selected according to the type of the content, a site associated with the content, server resource availability and/or class of service requirements or other business rules is provided. In this scheme, the cache protocol may be further selected according to load balancing requirements and/or traffic conditions within a network. Also, the cache protocol may be varied according to the traffic conditions or other factors. For example, the cache protocol may migrates from a first protocol (e.g., CARP) that allows only one copy of the content to be stored to a second protocol (e.g., HTCP or ICP) that allows more than one copy of the content to be stored. The site may be an origin server for the content.

In a further embodiment, the depth to which a request query is to be searched within a cache hierarchy is determined according to at least one of a site associated with the query, a content type associated with the query and a class of service associated with the query. The site may be an origin server for content associated with the request query. Also, a path for retrieving the content may be determined, at least in part, according to the content type associated with the request query.

In yet another embodiment, an Internet content delivery system (ICDS) is configured to determining the depth to which a request query is to be searched within a cache hierarchy according to a content type associated with the request query, a site associated with the query and/or a class of service associated with the query. The site may be an origin server for content associated with the request query.

Still another embodiment provides an ICDS configured to manage the storing of content of a particular type at one or more cache servers according to a cache protocol selected according to the type of the content, a site associated with the content and/or a class of service. As before, the cache protocol may be selected and/or varied according to load balancing requirements and/or traffic conditions within a network. In some cases, the cache protocol may migrate from a first protocol (e.g., CARP) that allows only one copy of the content to be stored to a second protocol (e.g., ICP or HTCP) that allows more than one copy of the content to be stored. The ICDS can be further configured to determining a path for retrieving content associated with the request query. The path may be determined, at least in part, according to the content type associated with the request query.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Described below are various examples of schemes for improving the replication of content and, in particular, Internet content. Although discussed with reference to certain illustrated embodiments, upon review of this specification, those skilled in the art will recognize that the present schemes may find application in a variety of systems. Therefore, in the following description the illustrated embodiments should be regarded as exemplary only and should not be deemed to be limiting in scope.

Figure 3:
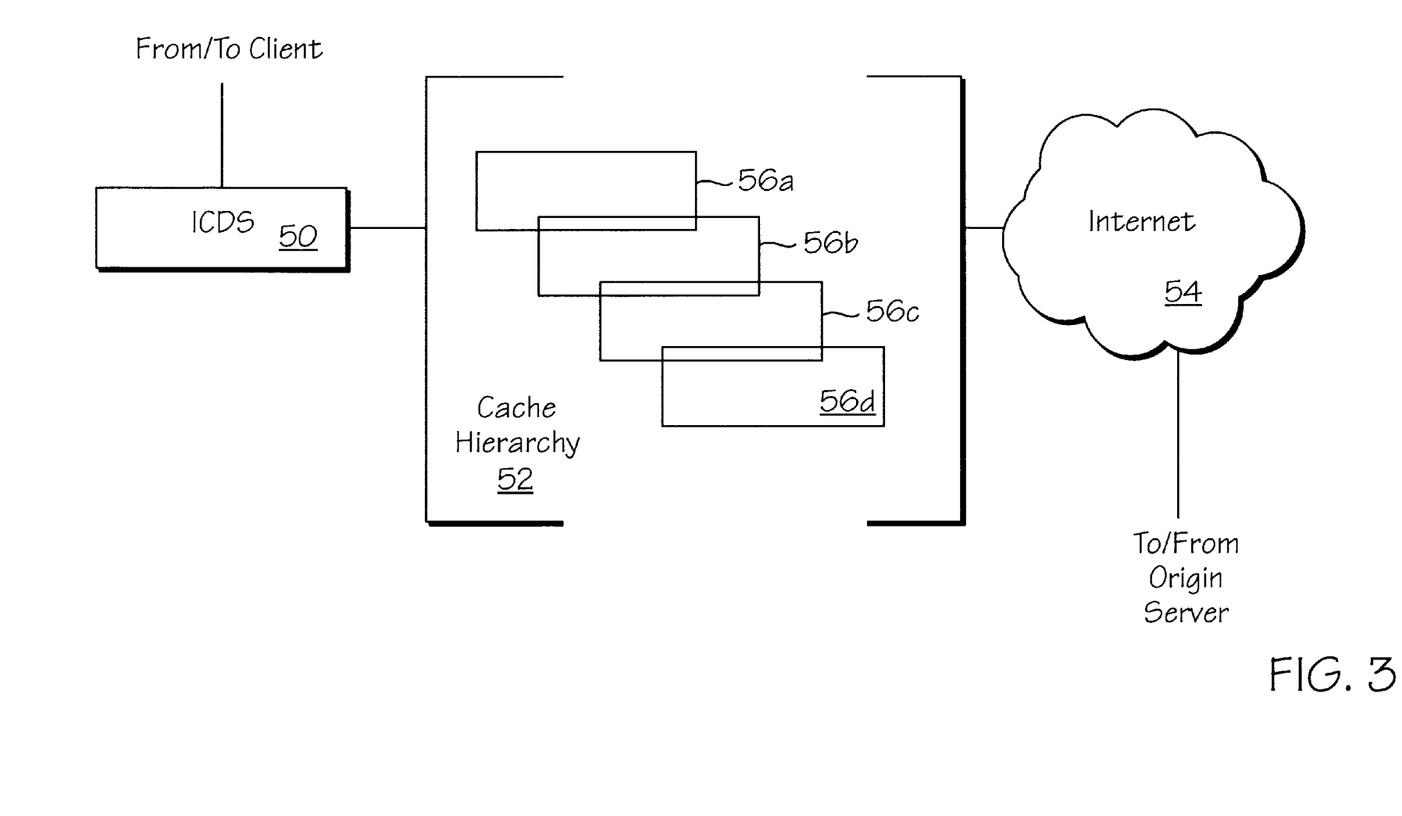
FIG. 3 illustrates an Internet content delivery system for use with one or more cache servers in accordance with an embodiment of the present invention.

FIG. 3 illustrates an Internet Content Delivery System (ICDS) 50 configured to provide dynamic protocol selection and query resolution for one or more cache servers in accordance with an embodiment of the present invention. Note that although the present schemes are discussed primarily with respect to ICDS 50, the methodologes and practices, as well as hardware and software components thereof, of the present invention may also be embedded into other applications and or platforms. ICDS 50 may be located at any point along a delivery path between a client that requests content and a server (or other source) that provides it. Thus, ICDS 50 may be resident as part of a personal cache server or personal proxy server, a POP cache server, an edge cache server, a cache server at a peering point, a firewall proxy server and/or at major traffic sites for a provider's content.

In particular, ICDS 50 is especially useful when operated in conjunction with multiple cache servers (perhaps at various locations, physically and/or logically), arranged in a hierarchy or a mesh 52. When used in such environments, ICDS 50 specifies appropriate profiles for the caching of content. That is, ICDS 50 is able to determine what cache protocol (e.g., ICP, CARP, etc.) is to be associated with a particular request, in a content deterministic, site deterministic, traffic deterministic, class of service deterministic and/or other fashion. oreover, ICDS 50 may be configured to specify how far a request should be searched within the cache hierarchy 52 before being passed to the associated origin server (e.g., via the Internet 54). Note that various communication links, including wired, wireless and/or satellite links may couple ICDS 50 with cache hierarchy 52 and/or clients.

Preferably, ICDS 50 provides these capabilities within a heuristic framework that adapts to network conditions. In other embodiments, ICDS 50 may be implemented with a policy-based architecture that does not necessarily adapt over time. Regardless of the particular implementation, however, ICDS 50 provides a feature set not previously available with or for cache servers.

To provide the dynamic protocol selection referred to above, ICDS 50 may be configured to recognize content types and/or content sources associated with requests it receives. For example, requests for real-time streaming content may be directed to ICDS 50 using the RTSP protocol. Net News requests may be directed to ICDS 50 using the NNTP (Network News Transport Protocol), while requests for Web pages and the like may be received according to HTTP. By being able to recognize the content type associated with these different requests (e.g., based on the transport protocol or otherwise), ICDS 50 is able to determine which caching protocol is appropriate. That is, ICDS 50 is able to make a content deterministic evaluation of the appropriate cache protocol to be used.

For example, real-time content (such as stock quotes, etc.) is continually varying. It may not make sense to cache such content at all, given this constantly varying nature. Thus, when presented with a request for such content, ICDS 50 may determine that no cache in the hierarchy should be consulted and that the content should be retrieved directly from its origin server. Moreover, ICDS 50 may determine that no copies of this content should be stored and thus direct that the request not be cached. In other cases, for example where bandwidth costs make it appropriate or where the demand for content (i.e., any content—stale or otherwise) is so great, it may make commercial sense to store at least one copy of the real-time content, making CARP an appropriate choice.

For other content types (e.g., HTML pages transported according to HTTP), ICDS 50 may determine that at least one server in the hierarchy should store a copy of the content. Thus, CARP may be appropriate as it allows all subsequent requests for the same content to be directed to a common cache server. If at some later time ICDS 50 determines that there are so many requests for the content that the server storing that content is becoming a bottleneck, the cache policy associated with that content may be changed (e.g., to ICP or HTCP (hyper-text cache policy)0. This would allow for multiple copies of the content to be kept among different cache servers 56*a*–56*d* in the hierarchy 52. ICDS 50 could then load balance requests for the content among the various severs storing a copy, allowing for faster user response time.

In such a scheme, different load balancing options may be available, for example round robin load balancing. In a round-robin scheme, cache servers are grouped together based on their IP address (and possibly port number). As requests are received, they are passed to each of the cache servers in sequence. Thus, if there are four cache servers A, B, C, and D, then the first request would go to A, the next to B, the next to C, the next to D, and so on, repeating the sequence. In addition to a straight round-robin approach, some schemes support weighting servers. In these arrangements, an administrator may decide what proportion of requests (connections) should be directed to each cache server based on its perceived size, and assign weights accordingly (e.g., A=1, B=5, C=2, D=20). Then requests may be allotted to each of the servers in accordance with their assigned weights.

Another load-balancing scheme is based on how many current connections a cache server is handling. To illustrate, consider three servers A, B, and C and assume servers A and B each have three active connections while and server C has one. To properly balance the load among these servers in a connection-based fashion, the next two connection requests would be assigned to server C. In the event that all servers have the same number of connections, then resort may be had to round robin load balancing. Connection-based schemes may be modified to allow an administrator to weight servers as above.

Note that, in general, hash-based load balancing schemes are another option. In these schemes, it is often the case that an administrator has determined that it would be desirable to have the same server always handle requests for a given site. As an example, assume that a site has three cache servers A, B, and C. Under a round-robin system, the first request for a given URL would be passed to server A, which would retrieve the requested information and add it to its cache. The next request would go to server B, which would also retrieve the requested information and store it, and similarly for server C. In this model, a request would not be serviced from a cache until the fourth request was made. Moreover, up to four separate copies of the requested information (one in each cache and one at the origin server), all of which may be different, may exist. To solve this problem, a hash-based load-balancing scheme creates a key that ensures that a request for a given URL will always be directed to the same cache server. Only in the event that server is not available will the request be forwarded to a different server for processing. Of course, hash-based load balancing operations are implicit in CARP and are not always appropriate for ICP-based caching operations.

Anther method for performing load balancing is based on the monitoring of IP traffic statistics. This method relies on computing a weight, based on connection creation time, bytes transferred, network errors (i.e., dropped packets), and network latency. As the load balancer (e.g., ICDS 50) receives each new request, it examines the weights of all the available servers and attempts to direct the request to the least loaded server. The results of each request are then used to update the weights, to continuously tune to the least loaded server.

In addition to (or in place of) content-deterministic protocol resolution, ICDS 50 may provide site-deterministic protocol resolution. For example, ICDS 50 may determine that a particular request has taken a long time to satisfy on previous occasions and, therefore, the content associated with that request should be replicated elsewhere in order to speed user response time. Thus, ICDS 50 may direct that the content be cached under HTCP or even ICP, so as to allow multiple cache servers in the hierarchy 52 to store a copy of the content. The exact protocol to use may vary with time, according to traffic conditions or other factors.

Still further, ICDS 50 may determine the appropriate cache protocol to associate with a request according to the class of service to be accorded a particular client/customer. For example, some customers may always want their requests to resolve to the origin server associated therewith and, therefor, would never have content cached. Others may want to always search deep into a cache hierarchy before incurring bandwidth charges associated with a request to the origin server. Still other customers may seek a middle ground between these extremes. By examining the requests it receives, ICDS 50 may determine which cache protocol is appropriate for the particular class of service to be provided. Of course, such determinations may vary according to network conditions, content type, time of day, etc.

As implied above, in addition to the dynamic protocol resolution operations, ICDS 50 is capable of determining how far into the cache hierarchy 52 (e.g., on a hop count basis, a time-out basis or otherwise) a request should be transmitted before it is passed to the origin server. Again, these determinations made be made on a content basis, a site basis, a class of service basis or on another basis.

For example, where Net News is requested it may always be the case that the cache hierarchy 52 should be searched completely before retrieving the information from the origin server. Net News is static in that once posted, the information does not change. Therefore, copies of Net News are never "stale" and previously cached copies (no matter how deep in a cache hierarchy) are always viable content for delivery. On the other hand, Net News can comprise very large files that would take considerable time to transport across the Internet 54 from the origin server. Thus, these realities tend to indicate that it would be appropriate for ICDS 50 to always search the cache hierarchy 52 for such content before sending a request to the origin server. Of course, such policies may be tempered by the fact that users would not appreciate lengthy delays, so a more moderate search depth may be appropriate on occasion.

Other content types, for example HTML pages, may only be searched for one or two levels within cache hierarchy 52, because such pages may be easily retrieved from an origin server without consuming undue bandwidth. Moreover, users are becoming accustomed to rapid responses for Web page requests and the like and so may not appreciate undue delays in receiving such content. In any event, ICDS 50 is capable of determining the content type from the request and directing the level or depth of cache search within the hierarchy appropriately.

A related concept to this dynamic query resolution is the determination of which method to use to retrieve the requested content. Often, a cache server will have multiple ways of retrieving requested information (e.g., via a high-speed fiber link, a satellite communication link, etc.). ICDS 50 can participate in such a decision if provided with information regarding the available delivery means. For example, ICDS 50 may indicate that requested HTML content should be delivered using the fastest available delivery path, so as to avoid unnecessary delays in responding to the request. Net News, however, may be delivered across slower (and, hence, less expensive) means as it may involve a deeper search into, the hierarchy and thus be associated with significant delays already.

Throughout all of the above, it is recognized that ICDS 50 may respond to requests according to predetermined policies or, preferably, in an adaptive fashion. That is, ICDS 50 may be configured to always provide cache policies in a pre-scribed fashion, for example CARP for Net News, ICP for HTML requests, etc. However, a preferred option is for ICDS 50 to be allowed to develop cache policies according to the traffic (or other) conditions being currently experienced. Thus, an HTML request may be cached according to CARP in the first instance. Then, as more and more requests for the same content are received, ICDS 50 may update the cache policy to reflect this fact and migrate to a protocol that allows for better load balancing and/or response time (e.g., HTCP and/or ICP).

This type of adaptation may be applied to any of the schemes described above and may be expressed in a heuristic fashion that associates certain rules with each protocol option. For example, rules may be developed according to the strengths and weaknesses of the available cache protocols. Thus, ICP may be preferred in situations where numerous (e.g., beyond a certain threshold) requests for a document are received. Conversely, CARP may be preferred where relatively few requests for a particular document are being made, or where the document is observed to be updated relatively frequently. By examining current traffic characteristics against or in light of these rules, ICDS 50 may be able to choose the cache policy for particular content, site(s), etc. that best fits the situation.

Figure 4:
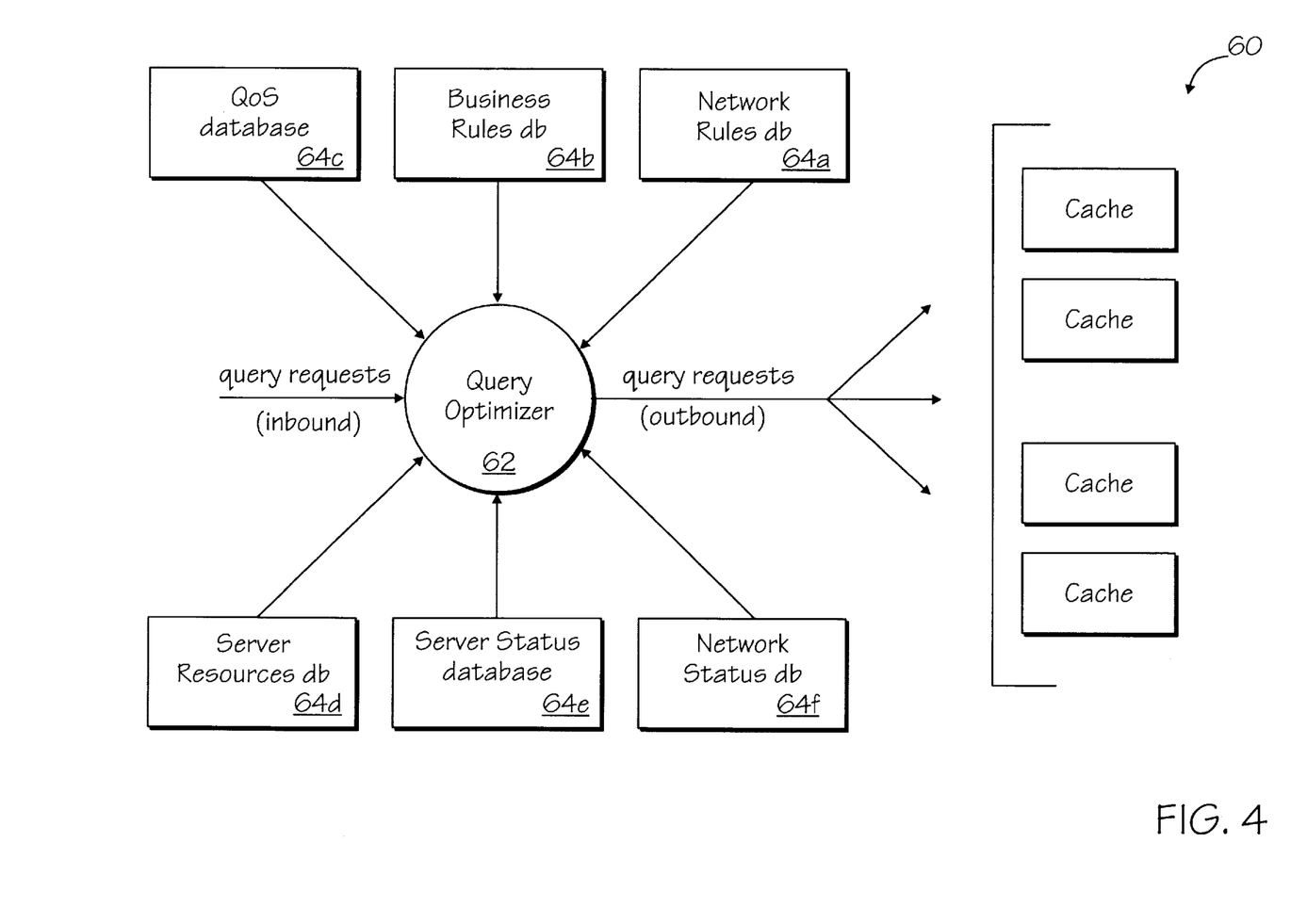
FIG. 4 illustrates a cost-based optimizer configured in accordance with an embodiment of the present invention.

As shown in FIG. 4, other factors may also influence or affect the selection of a cache query protocol or retrieval method. For example, factors such as network latency network cost, network congestion/availability, server availabilty, "business rules" (e.g., customer paid-for feature sets), quality of service (QoS) and/or prior hit and/or usability ratios may all play a role in determining what cache policy should be employed. Thus, a group of cache servers 60 (which may be organized hierarchically and/or as peers) may be operated under the control of a query optimizer 62.

Query optimizer 62 may have access to a number of databases 64*a*–64*f*, each of which may specify or define query resolution rules and/or procedures. For example, a network rules database 64*a* may specify different path costs, peering hit ratios and so on. A business rules database 64*b* may specify customer-specific requirements, while a QoS database 64*c* may specify more general query resolution requirements based on a QoS for the type of traffic or point of origin of the content being sought.

Server resource database 64*d* and server status database 64*e* may provide information regarding the cache servers that make up group 60, so as to allow for load balancing, protocol resolution/selection and/or performance monitoring. Network status database 64*f* can provide information regarding route congestion, etc. Query optimizer 62 is thus able to sypthesize the information received from the various databases 64*a*–64*f* to direct inbound query requests to an appropriate member of this group of cache servers 60.

Thus a dynamic protocol selection and query resolution scheme for a cache server has been described. Although the foregoing description and accompanying figures discuss and illustrate specific embodiments, it should be appreciated that the present invention is to be measured only in terms of the claims that follow.

What is claimed is:

1. A method, comprising storing content of a particular type at one or more cache servers according to a cache protocol selected according to the type of the content and traffic conditions within a network.

2. The method of claim 1 wherein the cache protocol is further selected according to load balancing requirements.

3. The method of claim 2, wherein load balancing is applied using one of round robin load balancing, weighting server load balancing, connection-based load balancing, hash-based load balancing, and load balancing based on monitoring Internet Protocol (IP) traffic statistics.

4. The method of claim 1 wherein the cache protocol is varied according to traffic conditions within the network.

5. The method of claim 4 wherein the cache protocol migrates from a first protocol that allows only one copy of the content to be stored to a second protocol that allows more than one copy of the content to be stored.

6. The method of claim 5 wherein the first protocol comprises the Cache Array protocol (CARP) and the second protocol comprises one of the Hyper-Text Cache protocol (HTCP) and the Internet Cache Protocol (ICP).

7. The method of claim 1 wherein the cache protocol is further selected according to a site associated with the content.

8. The method of claim 7 wherein the site comprises an origin server for the content.

9. The method of claim 8 wherein the cache protocol is further selected according to load balancing requirements.

10. The method of claim 9 wherein the cache protocol migrates from a first protocol that allows only one copy of the content to be stored to a second protocol that allows more than one copy of the content to be stored.

11. The method of claim 10 wherein the first protocol comprises the Cache Array protocol (CARP) and the second protocol comprises one of the Hyper-Text Cache protocol (HTCP) and the Internet Cache Protocol (ICP).

12. The method of claim 1, wherein the particular content type is determined based on a transport protocol used to make a request.

13. A method, comprising storing content of a particular type at a cache server according to at least one of an origin server for the content and a class of service, wherein a cache protocol is selected according to load balancing requirements and varied according to traffic conditions within a network.

14. The method of claim 13 wherein the cache protocol migrates from a first protocol that allows only one copy of the content to be stored to a second protocol that allows more than one copy of the content to be stored.

15. The method of claim 14 wherein the first protocol comprises the Cache Array protocol (CARP) and the second protocol comprises one of the Hyper-Text Cache protocol (HTCP) and the Internet Cache Protocol (ICP).

16. A method, comprising determining depth to which a request query is to be searched within a cache hierarchy according to a content type associated with the request query.

17. The method of claim 16 wherein the depth to which the request query is to be searched within the cache hierarchy is further determined according to at least one of a site associated with the query and a class of service associated with the query.

18. The method of claim 17 wherein the site comprises an origin server for content associated with the request query.

19. The method of claim 16 further comprising determining a path for retrieving content associated with the request query.

20. The method of claim 19 wherein the path is determined at least in part according to a content type associated with the request query.

21. An Internet content delivery system (ICDS) configured to determining the depth to which a request query is to be searched within a cache hierarchy according to a content type associated with the request query.

22. The ICDS of claim 21 wherein the depth to which the request query is to be searched within the cache hierarchy is further determined according to at least one of a site associated with the query and a class of service associated with the query.

23. The ICDS of claim 22 wherein the site comprises an origin server for content associated with the request query.

24. An Internet content delivery system (ICDS) configured to manage the storing of content of a particular type at one or more cache servers according to one or more of a cache protocol selected according to the type of the content and traffic conditions within a network, a site associated with the content and a class of service.

25. The ICDS of claim 24 wherein the cache protocol is further selected according to load balancing requirements.

26. The method of claim 24 wherein the cache protocol is varied according to traffic conditions within the network.

27. The ICDS of claim 26 wherein the cache protocol migrates from a first protocol that allows only one copy of the content to be stored to a second protocol that allows more than one copy of the content to be stored.

28. The ICDS of claim 27 wherein the first protocol comprises the Cache Array protocol (CARP) and the second protocol comprises one of the Hyper-Text Cache protocol (HTCP) and the Internet Cache Protocol (ICP).

29. The ICDS of claim 24 further being configured to determine a path for retrieving content associated with a request query.

30. The ICDS of claim 29 wherein the path is determined at least in part according to a content type associated with the request query.

31. A method, comprising storing content of a particular type at one or more cache servers according to a cache protocol selected according to the type of the content and the cache protocol is varied according to traffic conditions within a network.

32. The method of claim 31 wherein the cache protocol is further selected according to load balancing requirements.

33. The method of claim 32 wherein load balancing is applied using one of round robin load balancing, weighting server load balancing, connection-based load balancing, hash-based load balancing, and load balancing based on monitoring Internet Protocol (IP) traffic statistics.

34. The method of claim 31 wherein the cache protocol is further selected according to the traffic conditions within the network.

35. The method of claim 34 wherein the cache protocol is further selected according to load balancing requirements.

36. The method of claim 31 wherein the cache protocol migrates from a first protocol that allows only one copy of the content to be stored to a second protocol that allows more than one copy of the content to be stored.

37. The method of claim 36 wherein the first protocol comprises the Cache Array protocol (CARP) and the second protocol comprises one of the Hyper-Text Cache protocol (HTCP) and the Internet Cache Protocol (ICP).

38. The method of claim 31 wherein the cache protocol is further selected according to a site associated with the content.

39. The method of claim 38 wherein the site comprises an origin server for the content.

40. The method of claim 39 wherein the cache protocol is further selected according to load balancing requirements.

41. The method of claim 40 wherein the cache protocol migrates from a first protocol that allows only one copy of the content to be stored to a second protocol that allows more than one copy of the content to be stored.

42. The method of claim 41 wherein the first protocol comprises the Cache Array protocol (CARP) and the second protocol comprises one of the Hyper-Text Cache protocol (HTCP) and the Internet Cache Protocol (ICP).

43. The method of claim 31 wherein the particular content type is determined based on a transport protocol used to make a request.

* * * * *